(12) United States Patent
Shimano et al.

(10) Patent No.: US 10,090,736 B2
(45) Date of Patent: Oct. 2, 2018

(54) ROTARY ELECTRIC MACHINE INTEGRATED WITH CONTROL DEVICE

(71) Applicant: Mitsubishi Electric Corporation, Tokyo (JP)

(72) Inventors: Tomoaki Shimano, Tokyo (JP); Masahiko Fujita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 425 days.

(21) Appl. No.: 15/016,446

(22) Filed: Feb. 5, 2016

(65) Prior Publication Data

US 2017/0126101 A1 May 4, 2017

(30) Foreign Application Priority Data

Nov. 2, 2015 (JP) .................................. 2015-215399

(51) Int. Cl.
| | | |
|---|---|---|
| H02K 5/04 | (2006.01) | |
| H02K 9/22 | (2006.01) | |
| H02K 11/33 | (2016.01) | |
| H02K 3/04 | (2006.01) | |
| H02K 11/00 | (2016.01) | |
| H02K 19/36 | (2006.01) | |

(Continued)

(52) U.S. Cl.
CPC ................. *H02K 9/22* (2013.01); *H02K 3/04* (2013.01); *H02K 5/04* (2013.01); *H02K 5/225* (2013.01); *H02K 11/0094* (2013.01); *H02K 11/048* (2013.01); *H02K 11/33* (2016.01); *H02K 19/365* (2013.01)

(58) Field of Classification Search
CPC ..................................................... H02K 5/225
See application file for complete search history.

(56) References Cited

U.S. PATENT DOCUMENTS

| | | |
|---|---|---|
| 2003/0030964 A1 | 2/2003 | Oohashi et al. |
| 2010/0007231 A1 | 1/2010 | Imazawa et al. |
| 2011/0066332 A1 | 3/2011 | Sonoda et al. |

FOREIGN PATENT DOCUMENTS

| | | |
|---|---|---|
| DE | 69604973 T2 | 4/2000 |
| EP | 2276152 A2 | 1/2011 |
| EP | 2298622 A1 | 3/2011 |

(Continued)

OTHER PUBLICATIONS

Communication dated Feb. 9, 2017 from the German Patent Office in counterpart Patent Application No. 10 2016 202 835.9.

(Continued)

*Primary Examiner* — Ramon M Barrera
(74) *Attorney, Agent, or Firm* — Sughrue Mion, PLLC; Richard C. Turner

(57) ABSTRACT

A rotary electric machine integrated with a control device includes: a housing composed of a front bracket and a rear bracket and supporting a rotor and a stator; and a control device attached to the rear bracket. The control device is composed of: a power module having a switching element that is for energizing a stator winding of the stator; a field module having a switching element that is for energizing a field winding of the rotor; a heat sink cooling the power module and the field module; and a control board having a control circuit that controls the switching elements, the control device also including: a battery end terminal; and a grounding end terminal. Then, the heat sink is attached to the rear bracket while being insulated therefrom.

10 Claims, 6 Drawing Sheets

(51) Int. Cl.
H02K 5/22 (2006.01)
H02K 11/04 (2016.01)

(56) References Cited

FOREIGN PATENT DOCUMENTS

| | | |
|---|---|---|
| JP | 200790501 A | 4/2007 |
| JP | 2009124903 A | 6/2009 |
| JP | 201022113 A | 1/2010 |
| JP | 5449498 B1 | 3/2014 |
| JP | 201537357 A | 2/2015 |

OTHER PUBLICATIONS

Communication dated Nov. 22, 2016, issued by the Japan Patent Office in corresponding Japanese Application No. 2015-215399.

ROTARY ELECTRIC MACHINE INTEGRATED WITH CONTROL DEVICE

BACKGROUND OF THE INVENTION

1. Field of the Invention

The present invention relates to, for example, a rotary electric machine integrated with a vehicular control device, the rotary electric machine including: a stator having a stator winding, a rotor having a field winding, a bracket that supports the stator and the rotor, a brush that energizes the field winding, and a magnetic pole position detection sensor; and the rotary electric machine being attached with a control device, such as a power module that supplies electric power to the stator winding and a field module that supplies electric power to the field winding, on the back outside of a rear bracket of a main body of the rotary electric machine.

2. Description of the Related Art

Conventionally, in a rotary electric machine, there has been proposed a structure in which a heat sink that is for cooling switching elements, such as a power module and a field module which are a part of a control device is directly connected to a rear bracket. (For example, see Patent Document 1.)

Patent Document 1: Japanese Examined Patent Publication No. 5449498

In the aforementioned conventional rotary electric machine integrated with the control device disclosed in Patent Document 1, the heat sink is directly connected to the rear bracket; and accordingly, a problem exists in that a current including a high frequency component generated by pulse width modulation (PWM) operation is transferred to the vehicle side through the rear bracket and harmful influence such as noise is given to other electrical components mounted in the vehicle.

SUMMARY OF THE INVENTION

The present invention has been made to solve the above described problem, and an object of the present invention is to provide a rotary electric machine integrated with a control device, in which a battery end terminal and a grounding end terminal are provided and a heat sink is attached to a rear bracket while being insulated therefrom, whereby noise to the vehicle side can be reduced.

According to the present invention, there is provided a rotary electric machine integrated with a control device, the rotary electric machine including: a rotor composed of a field winding and a field core; a stator arranged around the rotor and composed of a stator winding and a stator core; a housing composed of an integrally coupled front bracket and rear bracket and supporting the rotor and the stator; and a control device attached to the rear bracket. The control device is composed of: a power module having a switching element that is for energizing the stator winding of the stator; a field module having a switching element that is for energizing the field winding of the rotor; a heat sink cooling the power module and the field module; and a control board having a control circuit that controls the switching elements, the control device also including: a battery end terminal; and a grounding end terminal. Then, the heat sink is attached to the rear bracket while being insulated therefrom.

According to the rotary electric machine integrated with the control device of the present invention, in the control device, the battery end terminal and the grounding end terminal are provided and the heat sink is attached to the rear bracket while being insulated therefrom, whereby a current including a high frequency component generated by PWM operation is not transferred to the vehicle side through the rear bracket and therefore noise to other electrical components mounted in the vehicle can be reduced.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiment 1

Figure 1:
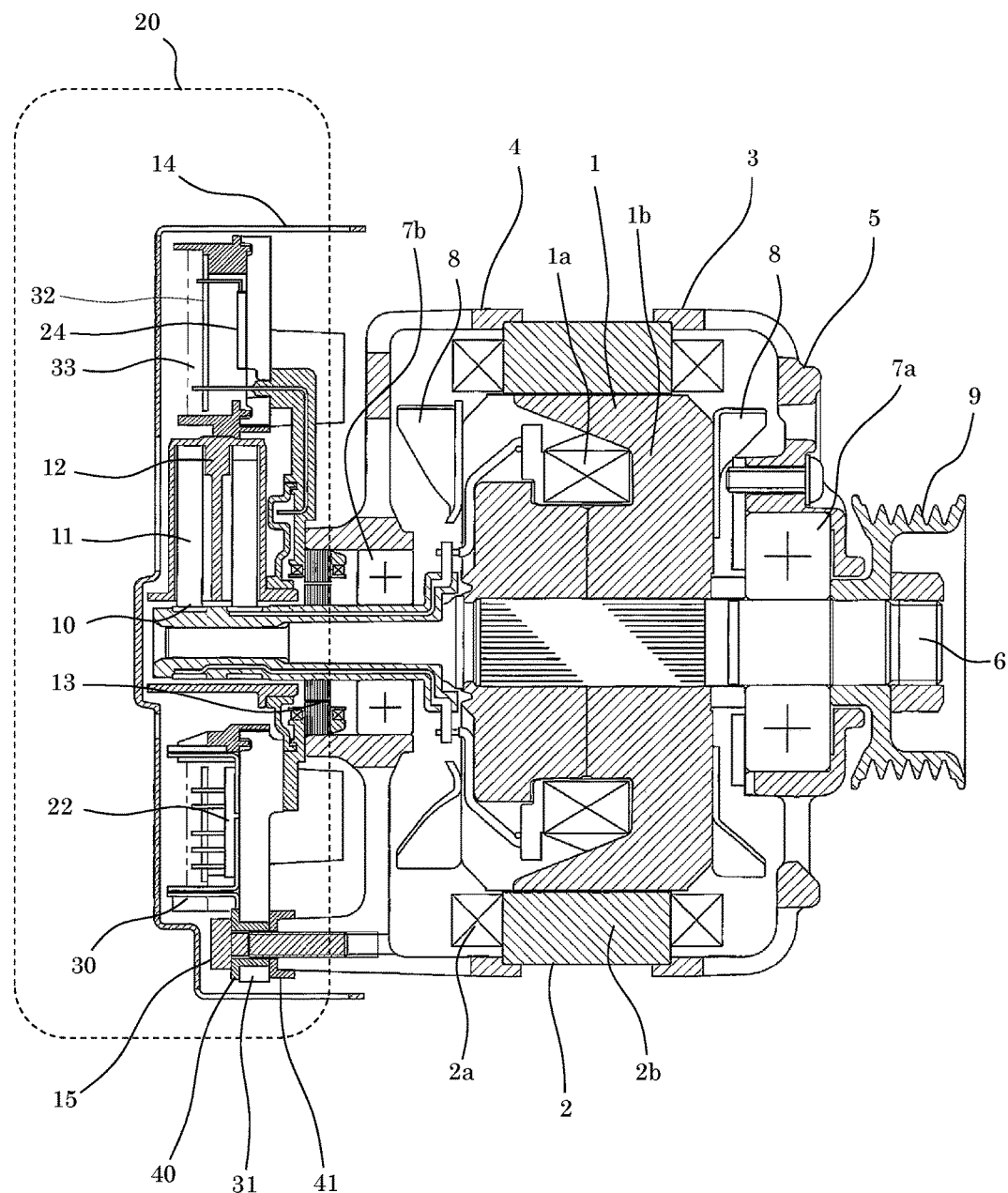
FIG. 1 is a sectional view showing a rotary electric machine integrated with a control device according to Embodiment 1 of the present invention.
Figure 2:
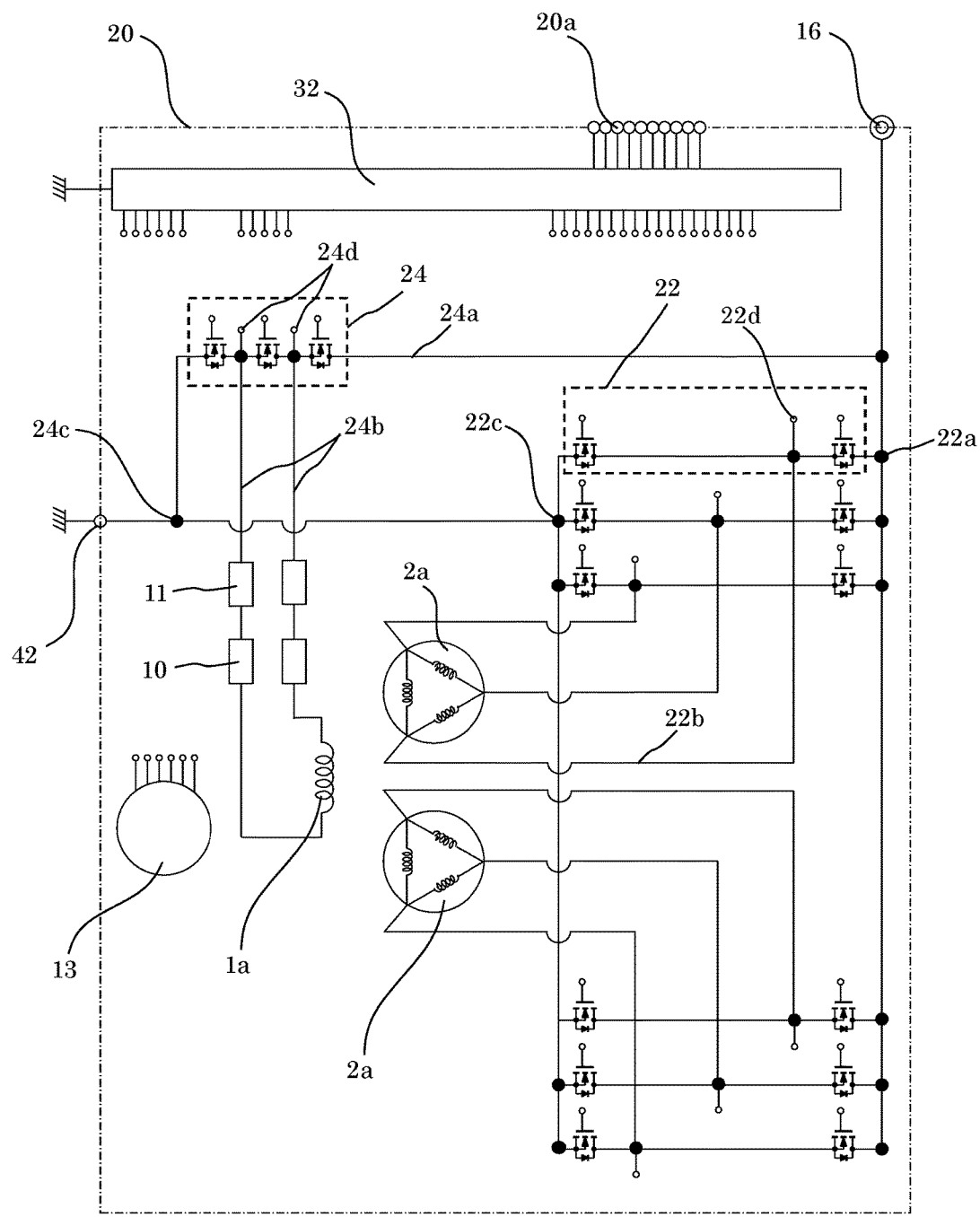
FIG. 2 is a schematic circuit diagram showing the rotary electric machine integrated with the control device according to Embodiment 1 of the present invention.
Figure 3:
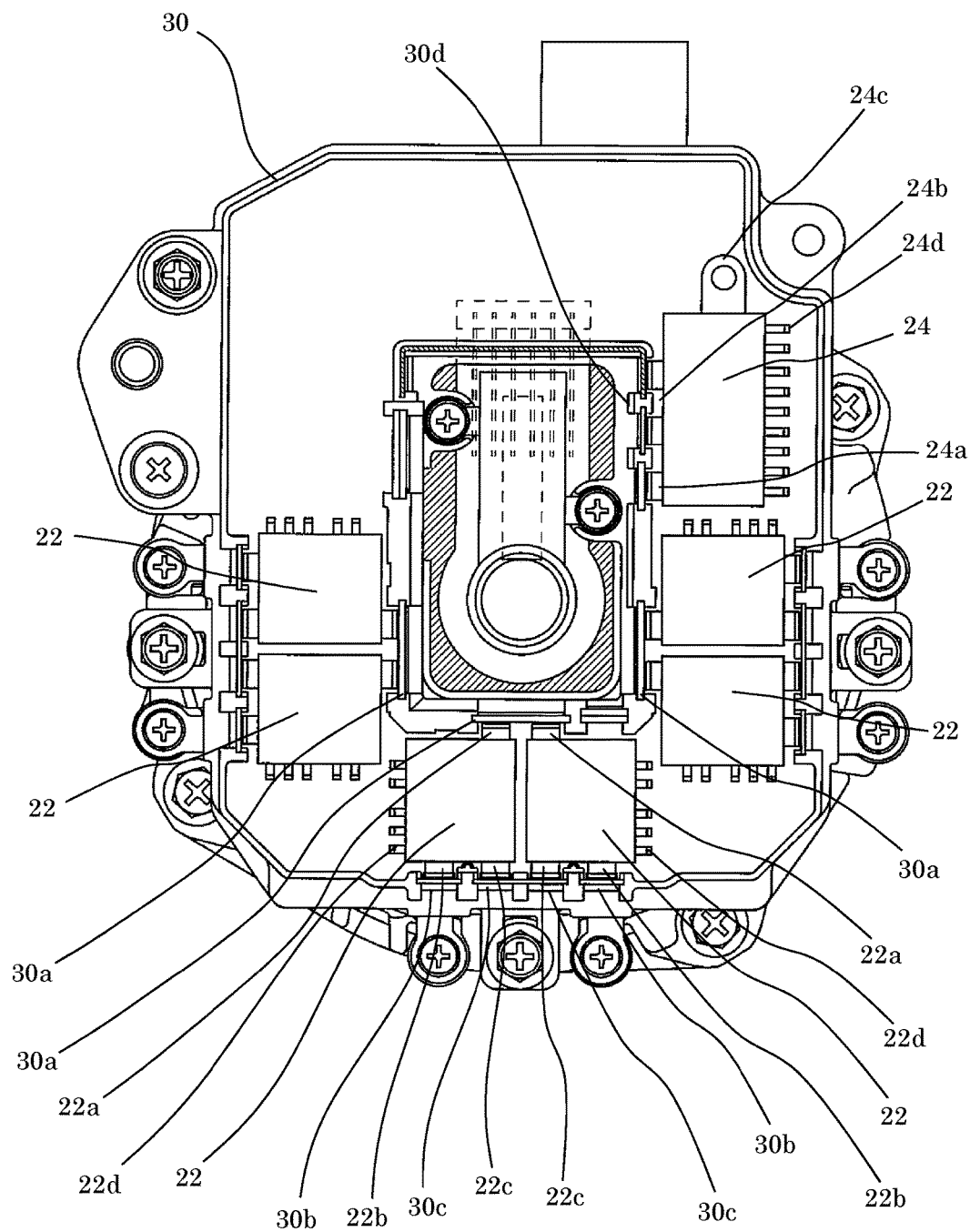
FIG. 3 is a front view showing a control device in the rotary electric machine integrated with the control device according to Embodiment 1 of the present invention.
Figure 4:
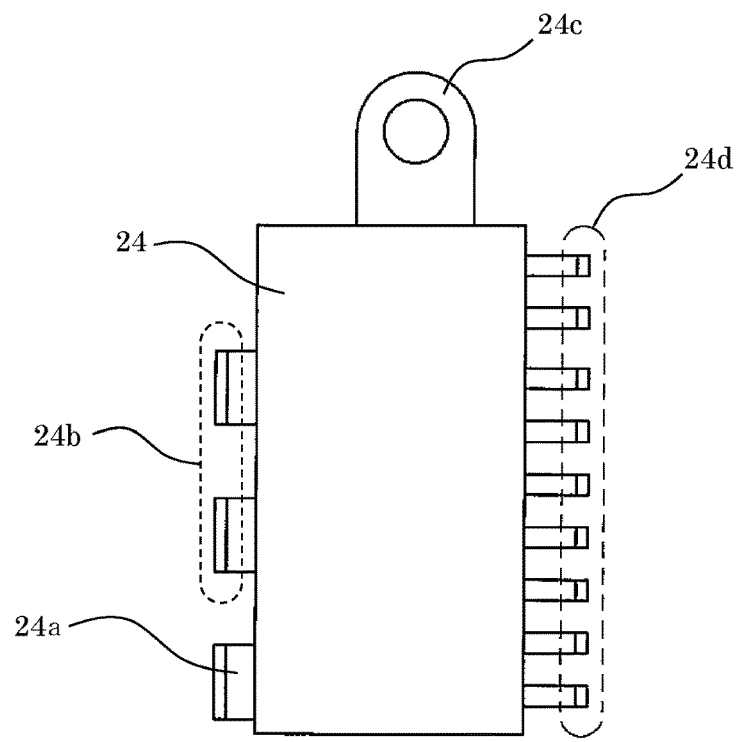
FIG. 4 is a front view showing a field module in the rotary electric machine integrated with the control device according to Embodiment 1 of the present invention.
Figure 5:
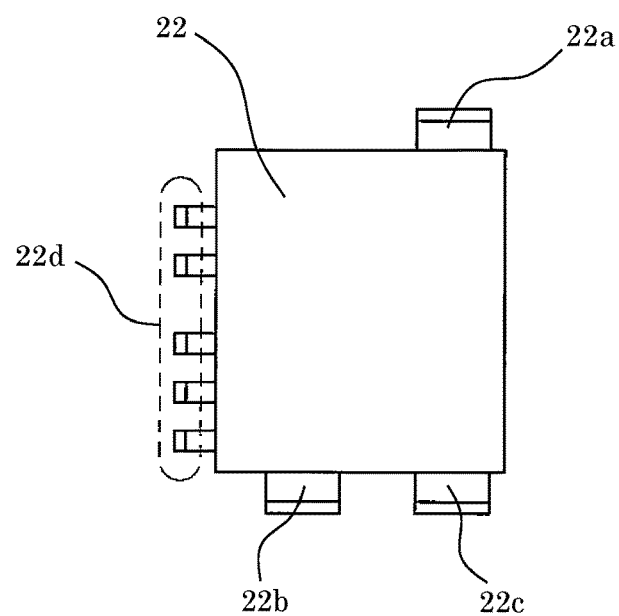
FIG. 5 is a front view showing a power module in the rotary electric machine integrated with the control device according to Embodiment 1 of the present invention.

Hereinafter, Embodiment 1 of the present invention will be described with reference to FIG. 1 to FIG. 5. Then, in each of the drawings, identical or equivalent members and portions will be described with the same reference numerals (and letters) assigned thereto. FIG. 1 is a sectional view showing a rotary electric machine integrated with a control device according to Embodiment 1 of the present invention. FIG. 2 is a circuit diagram showing the rotary electric machine integrated with the control device according to Embodiment 1 of the present invention. FIG. 3 is a front view showing a control device in the rotary electric machine integrated with the control device according to Embodiment 1 of the present invention. FIG. 4 is a front view showing a field module in the rotary electric machine integrated with the control device according to Embodiment 1 of the present invention. FIG. 5 is a front view showing a power module in the rotary electric machine integrated with the control device according to Embodiment 1 of the present invention.

In these respective drawings, the rotary electric machine includes: a rotor 1 in which a field winding 1a that is for generating magnetomotive force is wound around a field core 1b; a stator 2 in which a three-phase stator winding 2a is wound around a stator core 2b; a housing 5 which is composed of an integrally coupled front bracket 3 and rear bracket 4 and contains the rotor 1 and the stator 2; and a shaft 6 that supports the rotor 1. The stator 2 is fixed by being supported by one end portion of the front bracket 3 and one end portion of the rear bracket 4; and the rotor 1 is coaxially arranged inside the stator 2. The shaft 6 of the rotor 1 is rotatably and removably supported by a front bearing 7a and a rear bearing 7b which are provided in the housing 5; and the rotor 1 is configured so as to be capable of coaxially rotating with respect to the stator 2.

A cooling fan 8 that is for cooling components of the rotary electric machine is fixed on the both axial end surfaces of the rotor 1. A pulley 9 is attached to an end portion of the front side (the outside of the front bracket 3) of the shaft 6; a pair of slip rings 10 is attached to the rear side of the shaft 6; and a pair of brushes 11, which is slidably connected to the slip ring 10 and is for energizing a current to the field winding 1a, is arranged in the brush holder 12. The brush holder 12, the brush 11, and the slip ring 10 are those which are for supplying direct current (DC) electric power to the field winding 1a.

The rotary electric machine includes: a magnetic pole position detection sensor 13 that detects the magnetic pole position of the rotary electric machine; a control device 20 that is for energizing and controlling a stator current to the stator winding 2a; and an external cover 14 that contains the control device 20. The brush holder 12, the magnetic pole position detection sensor 13, and the control device 20 are arranged on the rear outside of the rear bracket 4. The magnetic pole position detection sensor 13 is arranged between the rear bearing 7b and the brush holder 12 and attached to a rear end portion of the rear bracket 4. In Embodiment 1, the magnetic pole position detection sensor 13 uses a winding type sensor and serves as the sensor by energizing a current to the winding.

The control device 20 is composed of: a power module 22 that contains a semiconductor switching element for a power circuit, which is for supplying the current to the stator winding 2a; a field module 24 that contains a semiconductor switching element for a field circuit, which is for controlling the electric power to be supplied to the field winding 1a; a resin-made case 30; a heat sink 31 that is for cooling the power module 22 and the field module 24; and a control board 32 on which a control circuit that is for controlling the semiconductor switching elements and the operation of the rotary electric machine. Incidentally, the control device 20 has an external signal input and output end terminal 20a that inputs and outputs an external signal. Furthermore, the control device 20 includes a battery end terminal 16 and a grounding end terminal 42.

The heat sink 31 is fixed by being fastened to the rear bracket 4 by a bolt 15 via an insulation bush 40 and an insulation bush 41 and is configured so that the potential of the heat sink 31 is not the same as that of the rear bracket 4.

The power module 22 and the field module 24 are mounted on the heat sink 31 via an insulating layer having high thermal conductivity (not shown in the drawing); and the control board 32 is mounted on the axial rear side of the power module 22 and the field module 24. The power module 22, the field module 24, and the control board 32 are contained in the heat sink 31 and the case 30; and a control device case is constituted by sticking the case 30 to the heat sink 31.

The heat sink 31 has a substantially annular shape whose hollow is located on the periphery of the shaft 6; the case 30 is also configured so as to be hollow on the periphery of the shaft 6; the periphery of the shaft 6 of the control device 20 is configured so as to be hollow; and the brush holder 12 and the magnetic pole position detection sensor 13 are arranged in the hollow portion of the control device 20.

The power module 22 has: a B terminal 22a having the same potential as an external battery and the battery end terminal 16 that is for inputting and outputting electric power; an AC terminal 22b having the same potential as an output line of the stator winding 2a; a GND terminal 22c having the same potential as the heat sink 31 provided with the grounding end terminal 42; and a signal line terminal 22d that is for controlling the internal semiconductor switching elements and the like. Then, the signal line terminal 22d is directly connected to the control board 32 by soldering, press-contacting, welding, and the like.

As for the case 30, a B terminal 30a having the same potential as the battery end terminal 16, an AC terminal 30b having the same potential as each phase stator winding 2a of the stator, and a GND terminal 30c having the same potential as the heat sink 31 are insert-molded; and the B terminal 30a is arranged on the inner peripheral side surface of the case 30 and is connected to the B terminal 22a of the power module 22.

Furthermore, the AC terminal 30b and the GND terminal 30c are insert-molded on the outer peripheral side surface of the case 30; and the AC terminal 30b of the case 30 is connected to the AC terminal 22b of the power module 22 and each phase stator winding 2a of the stator 2. The GND terminal 30c of the case 30 is connected to the GND terminal 22c of the power module 22. Furthermore, the GND terminal 30c of the case 30 is connected to the heat sink 31 provided with the grounding end terminal 42.

Furthermore, as in the power module 22, the field module 24 also has: a B terminal 24a having the same potential as the battery end terminal 16; a brush terminal 24b that is for energizing the brush 11; a GND terminal 24c having the same potential as the heat sink 31 provided with the grounding end terminal 42; and a signal line terminal 24d that is for controlling the internal semiconductor switching elements. The signal line terminal 24d is directly connected to the control board 32 by soldering, press-contacting, welding, and the like; and the B terminal 24a of the field module is connected to the B terminal 30a arranged on the inner peripheral side surface of the case 30. Furthermore, the brush terminal 24b that is for energizing the brush 11 is connected to the brush terminal 30d arranged on the inner peripheral side surface of the case 30. Furthermore, the GND terminal 24c of the field module 24 is connected to the heat sink 31 provided with the grounding end terminal 42.

The B terminal 22a of the power module 22 is connected to the B terminal 30a of the case 30 and is connected to the battery end terminal 16. When the rotary electric machine performs driving operation, a current to be flown from the battery end terminal 16 is passed through the B terminal 30a of the case 30 and is distributed to the B terminal 22a of the power module 22. When the rotary electric machine performs power generation operation, a current to be outputted from the stator winding 2a is passed through the B terminal 22a of the power module 22, is collected to the B terminal 30a of the case 30, and is outputted to the battery end terminal 16.

In Embodiment 1, the control device 20 includes the battery end terminal 16 and the grounding end terminal 42, the grounding end terminal 42 is engaged with the heat sink 31, and an insulation structure is made such that the heat sink 31 is attached to the rear bracket 4 while being insulated therefrom; and thus, a current including a high frequency component generated by PWM operation is not transferred to the vehicle side through the rear bracket and therefore noise that would affect other electrical components mounted in the vehicle can be reduced.

Embodiment 2

Figure 6:
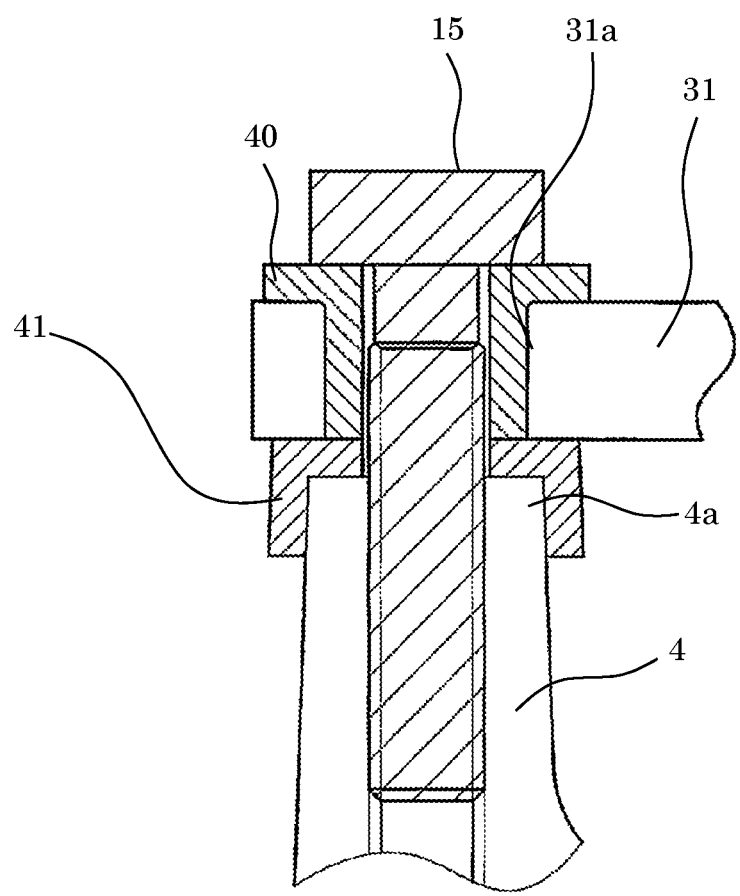
FIG. 6 is a relevant part sectional view showing a fastening place of a heat sink and a rear bracket in a rotary electric machine integrated with a control device according to Embodiment 2 of the present invention.

Embodiment 2 of the present invention will be described with reference to FIG. 6. FIG. 6 is a relevant part sectional view showing a fastening place of a heat sink and a rear bracket in a rotary electric machine integrated with a control device according to Embodiment 2 of the present invention.

The basic configuration of Embodiment 2 of the present invention is the same as that of the aforementioned Embodiment 1 and therefore their description will be omitted. In Embodiment 2 of the present invention, an insulation structure is made such that the insulation bush 40 is attached to an attachment hole 31a of the heat sink 31, the insulation bush 41 is attached to an attachment portion 4a of the rear bracket 4, and the heat sink 31 is fastened to the rear bracket 4 by the bolt via the insulation bush 40 and the insulation bush 41; and thus, compact and inexpensive finish can be achieved. Then, by providing such an insulation structure, a current including a high frequency component generated by PWM operation is not transferred to the vehicle side through the rear bracket and noise that would affect other electrical components mounted in the vehicle can be reduced.

Embodiment 3

Figure 7:
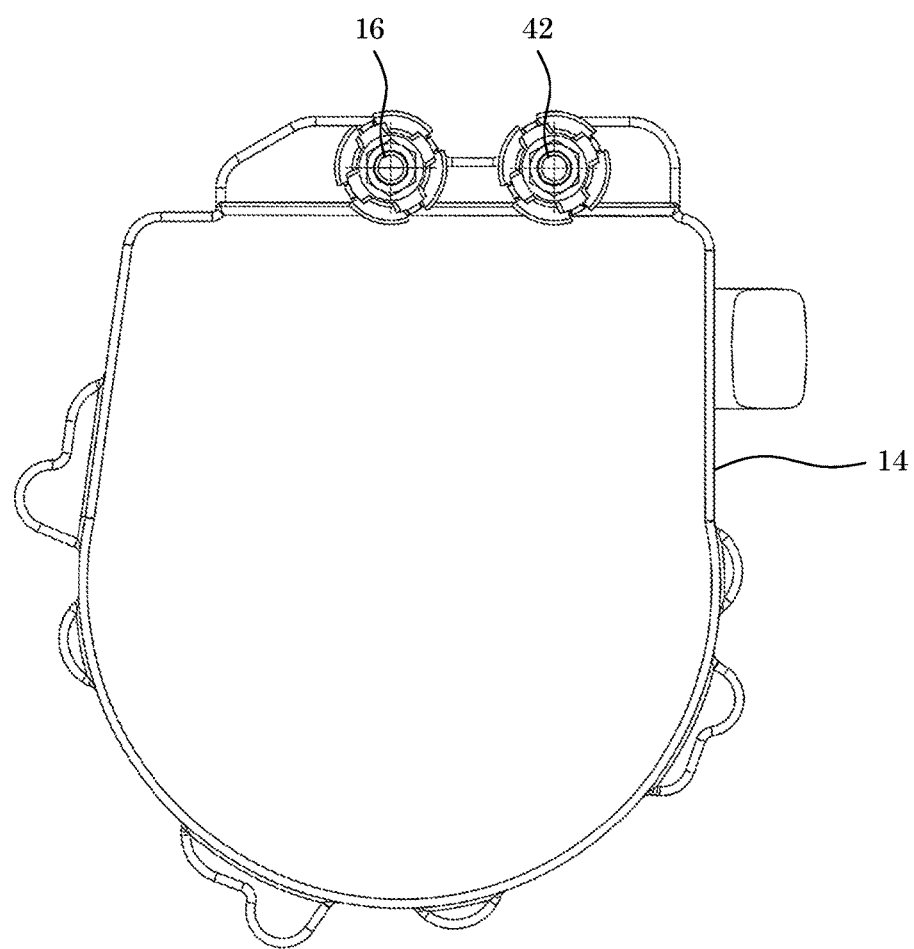
FIG. 7 is a front view showing the arrangement of a battery end terminal and a grounding end terminal in a rotary electric machine integrated with a control device according to Embodiment 3 of the present invention.

Embodiment 3 of the present invention will be described with reference to FIG. 7. FIG. 7 is a front view showing the arrangement of a battery end terminal and a grounding end terminal in a rotary electric machine integrated with a control device according to Embodiment 3 of the present invention.

The basic configuration of Embodiment 3 of the present invention is the same as that of the aforementioned Embodiment 1 and therefore their description will be omitted. In Embodiment 3 of the present invention, the battery end terminal 16 and the grounding end terminal 42 which are provided in the control device 20 are adjacently arranged while being insulated from each other; and thus, the length of wiring can be shortened and compactified, inductance is reduced, and noise can be reduced.

Embodiment 4

The basic configuration of Embodiment 4 of the present invention is the same as that of the aforementioned Embodiment 1 and therefore their description will be omitted. In Embodiment 4 of the present invention, material of the insulation bush 40 and the insulation bush 41 is made of poly phenylene sulfide (PPS) having high insulation resistance; and thus, the heat sink 31 and the rear bracket 4 can be effectively insulated.

Embodiment 5

The basic configuration of Embodiment 5 of the present invention is the same as that of the aforementioned Embodiment 1 and therefore their description will be omitted. In Embodiment 5 of the present invention, material of the insulation bush 40 and the insulation bush 41 is made of ceramics having high insulation resistance; and thus, the heat sink 31 and the rear bracket 4 can be effectively insulated.

Incidentally, the present invention can freely combine the respective embodiments and appropriately modify and/or omit the respective embodiments, within the scope of the present invention.

The present invention is suitable for achieving a rotary electric machine integrated with a control device which can reduce noise to the vehicle side.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. A rotary electric machine integrated with a control device, said rotary electric machine comprising:
   a rotor composed of a field winding and a field core;
   a stator arranged around said rotor and composed of a stator winding and a stator core;
   a housing composed of an integrally coupled front bracket and rear bracket and supporting said rotor and said stator; and
   a control device attached to said rear bracket,
   wherein said control device is composed of:
   a power module having a switching element that is for energizing said stator winding of said stator;
   a field module having a switching element that is for energizing said field winding of said rotor;
   a heat sink cooling said power module and said field module; and
   a control board having a control circuit that controls said switching elements,
   said control device also including:
   a battery end terminal; and
   a grounding end terminal, and
   wherein said heat sink is attached to said rear bracket while being insulated therefrom.

2. The rotary electric machine integrated with the control device according to claim 1,
   wherein said heat sink is fastened to said rear bracket by a bolt via an insulation bush.

3. The rotary electric machine integrated with the control device according to claim 1,
   wherein the battery end terminal and the grounding end terminal are adjacently arranged while being insulated from each other.

4. The rotary electric machine integrated with the control device according to claim 2,
   wherein the battery end terminal and the grounding end terminal are adjacently arranged while being insulated from each other.

5. The rotary electric machine integrated with the control device according to claim 2,
   wherein the insulation bush is made of poly phenylene sulfide.

6. The rotary electric machine integrated with the control device according to claim 3,
   wherein the insulation bush is made of poly phenylene sulfide.

7. The rotary electric machine integrated with the control device according to claim 4,
   wherein the insulation bush is made of poly phenylene sulfide.

8. The rotary electric machine integrated with the control device according to claim 2,
   wherein the insulation bush is made of ceramics.

9. The rotary electric machine integrated with the control device according to claim 3,
wherein the insulation bush is made of ceramics.

10. The rotary electric machine integrated with the control device according to claim 4,
wherein the insulation bush is made of ceramics.

* * * * *